US009062635B2

(12) United States Patent
Chi et al.

(10) Patent No.: US 9,062,635 B2
(45) Date of Patent: Jun. 23, 2015

(54) SYSTEM AND METHOD FOR ESTIMATING ENGINE EXHAUST MANIFOLD OPERATING PARAMETERS

(75) Inventors: John N. Chi, Dubuque, IA (US); Indranil Brahma, Bloomington, IN (US)

(73) Assignee: Cummins Inc., Columbus, IN (US)

(*) Notice: Subject to any disclaimer, the term of this patent is extended or adjusted under 35 U.S.C. 154(b) by 663 days.

(21) Appl. No.: 13/244,550

(22) Filed: Sep. 25, 2011

(65) Prior Publication Data
US 2013/0074494 A1   Mar. 28, 2013

(51) Int. Cl.
| F02B 33/44 | (2006.01) |
| F02M 25/07 | (2006.01) |
| G01M 15/00 | (2006.01) |
| F02D 41/00 | (2006.01) |
| F02D 41/14 | (2006.01) |

(52) U.S. Cl.
CPC ....... *F02M 25/0754* (2013.01); *F02M 25/0707* (2013.01); *F02M 25/0731* (2013.01); *F02D 41/0072* (2013.01); *F02D 41/1446* (2013.01); *F02D 41/1448* (2013.01); *F02D 2041/0075* (2013.01); *F02D 2200/0406* (2013.01); *Y02T 10/47* (2013.01)

(58) Field of Classification Search
CPC ............ F02D 41/0072; F02D 41/1446; F02D 41/1448; F02D 28/00; F02D 2041/0075; F02D 2200/0406; F02M 25/07; F02M 25/0707; F02M 25/0731; F02M 25/0754; G01F 1/34; G01F 1/36; G01F 1/363; G01F 1/40; G01F 1/88; Y02T 10/47

USPC ............... 60/605.2; 123/568.12; 701/108; 73/114.74, 118.1, 118.01–118.02
IPC ...................................................... F02M 25/07
See application file for complete search history.

(56) References Cited

U.S. PATENT DOCUMENTS

| 6,035,640 | A  | * | 3/2000  | Kolmanovsky et al. ...... 60/605.2 |
| 6,067,800 | A  | * | 5/2000  | Kolmanovsky et al. ........ 60/602 |
| 6,508,241 | B2 | * | 1/2003  | Miller et al. ................... 123/672 |
| 6,622,548 | B1 | * | 9/2003  | Hernandez ................. 73/114.74 |
| 6,697,729 | B2 | * | 2/2004  | Wright ......................... 60/605.2 |
| 6,725,847 | B2 | * | 4/2004  | Brunemann et al. ......... 60/605.2 |
| 6,802,302 | B1 | * | 10/2004 | Li et al. .......................... 701/108 |
| 6,837,227 | B2 | * | 1/2005  | Jaliwala et al. ............... 701/108 |
| 6,848,434 | B2 | * | 2/2005  | Li et al. ....................... 60/605.2 |
| 6,959,254 | B2 | * | 10/2005 | Reuschenbach et al. ..... 702/100 |
| 6,993,909 | B2 | * | 2/2006  | Matsunaga et al. .......... 60/605.2 |
| 7,296,562 | B2 | * | 11/2007 | Withrow et al. ............. 60/605.2 |
| 7,438,061 | B2 | * | 10/2008 | Wang et al. ................... 701/101 |
| 7,946,117 | B2 | * | 5/2011  | Atkinson et al. ............. 60/605.2 |

(Continued)

*Primary Examiner* — Thai Ba Trieu
(74) *Attorney, Agent, or Firm* — Faegre Baker Daniels LLP (57) ABSTRACT

A system and method are provided for estimating an operating parameter of an exhaust manifold of an engine. In the system, a flow value is determined that corresponds to a flow rate of exhaust gas through an EGR conduit fluidly coupled between the exhaust manifold and the intake manifold. The EGR conduit includes an exhaust gas cooler disposed in-line with the EGR conduit and a property of the exhaust gas exiting an exhaust gas outlet of the cooler is measured. The operating parameter of the exhaust manifold is estimated as a function of at least the flow value and the property of the exhaust gas exiting the exhaust gas outlet of the cooler. Illustratively, the operating parameter of the exhaust manifold may be exhaust manifold pressure and/or temperature.

22 Claims, 4 Drawing Sheets

(56) References Cited

U.S. PATENT DOCUMENTS

| | | | |
|---|---|---|---|
| 8,037,737 B2 * | 10/2011 | Recouvreur et al. | 73/114.71 |
| 8,091,535 B2 * | 1/2012 | Nitzke et al. | 60/605.2 |
| 8,201,442 B2 * | 6/2012 | Osburn et al. | 73/114.74 |
| 8,267,069 B2 * | 9/2012 | Hsia et al. | 701/108 |
| 8,555,864 B2 * | 10/2013 | Nitzke et al. | 60/605.2 |
| 2003/0075158 A1 * | 4/2003 | Milos et al. | 73/118.1 |
| 2009/0277431 A1 * | 11/2009 | Nitzke et al. | 60/605.2 |
| 2010/0131181 A1 * | 5/2010 | Herrmann | 701/108 |
| 2011/0118959 A1 * | 5/2011 | Porten et al. | 701/108 |
| 2012/0060499 A1 * | 3/2012 | Nitzke et al. | 60/605.2 |

* cited by examiner

SYSTEM AND METHOD FOR ESTIMATING ENGINE EXHAUST MANIFOLD OPERATING PARAMETERS

FIELD OF THE INVENTION

The present invention relates generally to internal combustion engines, and more specifically to systems and methods for estimating engine exhaust manifold parameters during the operation of internal combustion engines.

BACKGROUND

Exhaust gas is produced during the operation of conventional internal combustion engines, and is conventionally directed away from an engine via an engine exhaust manifold. It is desirable to estimate one or more operating parameters of such an engine exhaust manifold during the operation of an internal combustion engine using information provided by actual and/or virtual on-board sensors other than exhaust manifold operation sensors.

SUMMARY

The present invention may comprise one or more of the features recited in the claims appended hereto, and/or one or more of the following features and combinations thereof. A system for estimating an operating parameter of an exhaust manifold operatively coupled to an internal combustion engine may comprise an exhaust gas recirculation (EGR) conduit fluidly coupled at one end to the exhaust manifold and at an opposite end to an intake manifold operatively coupled to the engine, a cooler disposed in-line with the EGR conduit and configured to cool exhaust gas flowing therethrough, means for determining a flow value corresponding to a flow rate of exhaust gas through the EGR conduit, an exhaust gas parameter sensor in fluid communication with the EGR conduit adjacent an exhaust gas outlet of the cooler and configured to produce a first signal indicative of a property of the exhaust gas exiting the cooler, and a control circuit including a memory having instructions stored therein that are executable by the control circuit to estimate the operating parameter of the exhaust manifold as a function of at least the flow value and the first signal.

In one illustrative embodiment of the system, the exhaust gas parameter sensor may be a pressure sensor, the first signal may be indicative of exhaust gas pressure in the EGR conduit adjacent to the exhaust gas outlet of the cooler and the operating parameter of the exhaust manifold may be exhaust manifold pressure. In this embodiment, the instructions stored in the memory may further include instructions that are executable by the control circuit to determine a pressure drop across the cooler as a function of the flow value, and to estimate the exhaust manifold pressure as a function of the first signal and the pressure drop across the cooler. The instructions stored in the memory may further include instructions that are executable by the control circuit to process the first signal to determine the exhaust gas pressure in the EGR conduit adjacent to the exhaust gas outlet of the cooler, and to estimate the exhaust manifold pressure as a sum of the exhaust gas pressure in the EGR conduit adjacent to the exhaust gas outlet of the cooler and the pressure drop across the cooler. The system of this embodiment may further comprise a turbocharger having a turbine defining an exhaust gas inlet fluidly coupled to the exhaust manifold via an exhaust gas conduit, and the one end of the EGR conduit may be fluidly coupled to the exhaust gas conduit between the exhaust manifold and the exhaust gas inlet of the turbine such that the estimated exhaust manifold pressure represents a back pressure between the exhaust manifold and the turbine.

In another illustrative embodiment of the system, the exhaust gas parameter sensor may be a first temperature sensor, the first signal may be indicative of exhaust gas temperature in the EGR conduit adjacent to the exhaust gas outlet of the cooler and the operating parameter of the exhaust manifold may be exhaust manifold temperature. This embodiment may further comprise a second temperature sensor configured to produce a second signal that is indicative of an operating temperature of engine coolant entering the cooler, and the instructions stored in the memory may include instructions that are executable by the control circuit to estimate the exhaust manifold temperature as a function of the flow value, the first signal and the second signal. The instructions stored in the memory may further include instructions that are executable by the control circuit to determine a cooler effectiveness value as a function of the flow value, and to estimate the exhaust manifold temperature as a function of the first signal, the second signal and the cooler effectiveness value. The instructions stored in the memory may further include instructions that are executable by the control circuit to process the first signal to determine the exhaust gas temperature adjacent to the exhaust gas outlet of the cooler, to process the second signal to determine the temperature of the engine coolant entering the cooler, and to estimate the exhaust manifold temperature as a ratio of the exhaust gas temperature adjacent to the exhaust gas outlet of the cooler less a product of the cooler effectiveness value and the temperature of the engine coolant entering the cooler and a difference of one less the cooler effectiveness value. In this embodiment, the system may further comprise a turbocharger having a turbine defining an exhaust gas inlet fluidly coupled to the exhaust manifold via an exhaust gas conduit, and the one end of the EGR conduit may be fluidly coupled to the exhaust gas conduit between the exhaust manifold and the exhaust gas inlet of the turbine such that the estimated exhaust manifold temperature represents a temperature of exhaust gas exiting the exhaust manifold and entering the exhaust gas inlet of the turbine.

The cooler may define an exhaust gas inlet positioned in direct fluid communication with the exhaust manifold with no exhaust gas flow restrictions positioned between the exhaust gas inlet of the cooler and the exhaust manifold.

A method for estimating an operating parameter of an exhaust manifold operatively coupled to an internal combustion engine having an exhaust gas recirculation (EGR) conduit fluidly coupled at one end to the exhaust manifold and at an opposite end to an intake manifold operatively coupled to the engine and a cooler disposed in-line with the EGR conduit and configured to cool exhaust gas flowing therethrough, may comprise determining a flow value corresponding to a flow rate of exhaust gas through the EGR conduit, measuring a property of the exhaust gas exiting an exhaust gas outlet of the cooler, and estimating the operating parameter of the exhaust manifold as a function of at least the flow value and the property of the exhaust gas exiting the exhaust gas outlet of the cooler.

In one illustrative embodiment of the method, the property of the exhaust gas exiting the exhaust gas outlet of the cooler may be exhaust gas pressure in the EGR conduit adjacent to the exhaust gas outlet of the cooler, and the operating parameter of the exhaust manifold may be exhaust manifold pressure. The method may further comprise determining a pressure drop across the cooler as a function of the flow value, and estimating the operating parameter of the exhaust manifold may comprise estimating the exhaust manifold pressure as a function of the exhaust gas pressure in the EGR conduit adjacent to the exhaust gas outlet of the cooler and the pressure drop across the cooler. Estimating the exhaust manifold pressure may further comprise estimating the exhaust manifold pressure as a sum of the exhaust gas pressure in the EGR conduit adjacent to the exhaust gas outlet of the cooler and the pressure drop across the cooler.

In another illustrative embodiment of the method, the property of the exhaust gas exiting the exhaust gas outlet of the cooler may be exhaust gas temperature in the EGR conduit adjacent to the exhaust gas outlet of the cooler, and the operating parameter of the exhaust manifold may be exhaust manifold temperature. The method may further comprise measuring an operating temperature of engine coolant entering the cooler, and estimating the operating parameter of the exhaust manifold may comprise estimating the exhaust manifold temperature as a function of the flow value, the exhaust gas temperature in the EGR conduit adjacent to the exhaust gas outlet of the cooler and the operating temperature of engine coolant entering the cooler. The method may further comprise determining a cooler effectiveness value as a function of the flow value, and estimating the exhaust manifold temperature may comprise estimating the exhaust manifold temperature as a function of the exhaust gas temperature in the EGR conduit adjacent to the exhaust gas outlet of the cooler, the operating temperature of engine coolant entering the cooler and the cooler effectiveness value. Estimating the exhaust manifold temperature may comprise estimating the exhaust manifold temperature as a ratio of the exhaust gas temperature in the EGR conduit adjacent to the exhaust gas outlet of the cooler less a product of the cooler effectiveness value and the operating temperature of the engine coolant entering the cooler and a difference of one less the cooler effectiveness value.

Determining a flow value corresponding to a flow rate of exhaust gas through the EGR conduit may comprise measuring the flow rate of exhaust gas through the EGR conduit. Alternatively or additionally, determining a flow value corresponding to a flow rate of exhaust gas through the EGR conduit may comprise measuring an intake manifold pressure corresponding to pressure with the intake manifold, measuring an EGR cooler outlet temperature corresponding to temperature at an exhaust gas outlet of the cooler, measuring a pressure drop across a flow restriction disposed in-line with the EGR conduit and positioned between the exhaust gas outlet of the cooler and the opposite end of the EGR conduit, and estimating the flow value as a function of the measured intake manifold pressure, the measured EGR cooler outlet temperature and the measured pressure drop across the flow restriction.

The method may further comprise measuring exhaust gas temperature in the EGR conduit adjacent to the exhaust gas outlet of the cooler, measuring an operating temperature of engine coolant entering the cooler, determining a cooler effectiveness value as a function of the flow value, and estimating exhaust manifold temperature as a function of the exhaust gas temperature in the EGR conduit adjacent to the exhaust gas outlet of the cooler, the operating temperature of engine coolant entering the cooler and the cooler effectiveness value.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
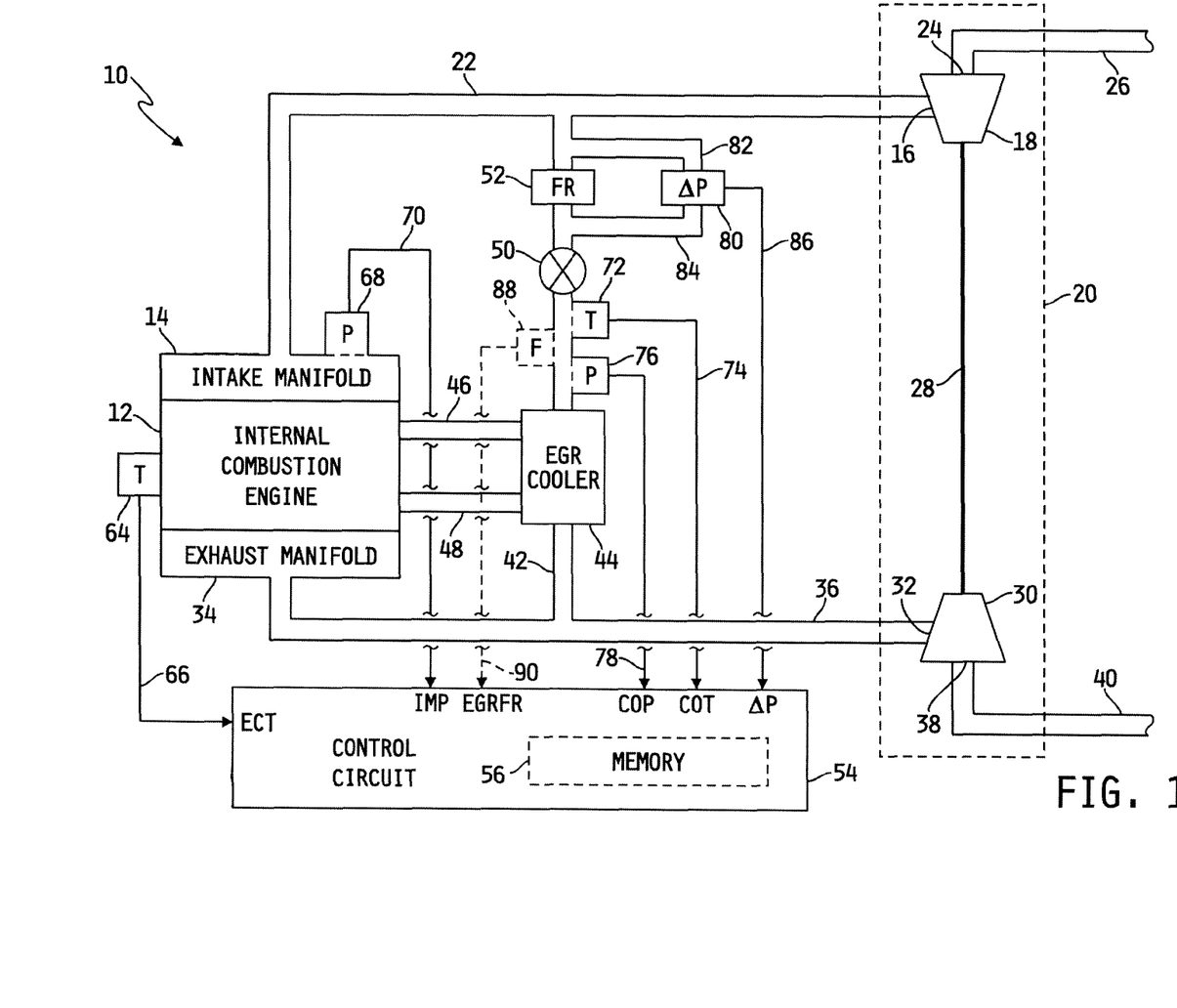
FIG. 1 is a diagram of one illustrative embodiment of a system for estimating engine exhaust manifold operating parameters.

Referring now to FIG. 1, a diagrammatic illustration is shown of one illustrative embodiment of a system 10 for estimating one or more engine exhaust manifold operating parameters. In the illustrated embodiment, the system 10 includes an internal combustion engine 12 having an intake manifold 14 that is fluidly coupled to an air outlet 16 of a compressor 18 of a conventional turbocharger 20 via an air intake conduit 22. The compressor 18 further includes an air inlet 24 coupled to an air intake conduit 26 for receiving fresh air. The turbocharger compressor 18 includes a rotatable wheel (not shown) that is mechanically coupled to one end of a rotatable drive shaft 28 having an opposite end that is mechanically coupled to a rotatable wheel (not shown) of a turbocharger turbine 30. The turbine 30 includes an exhaust inlet 32 that is fluidly coupled to an exhaust manifold 34 of the engine 12 via an exhaust conduit 36. The turbine 30 further includes an exhaust outlet 38 that is fluidly coupled to ambient via an exhaust conduit 40.

The turbocharger 20 operates in a conventional manner in which exhaust gas produced by the engine 12 and exiting the exhaust manifold 34 is directed through the turbine 30 causing the turbine wheel to rotate. This rotary motion is translated by the drive shaft 28 to the compressor wheel. The compressor wheel is configured in a conventional manner such that rotation of the compressor wheel by the drive shaft 28 draws more air through the air intake conduit 22 than would otherwise occur in the absence of the turbocharger 20.

The system 10 further includes an exhaust gas recirculation (EGR) conduit 42 having one end that is fluidly coupled to the exhaust manifold 34, e.g., via the exhaust conduit 36, and an opposite end that is fluidly coupled to the intake manifold 14, e.g., via the intake conduit 22. In some embodiments, although not shown in the embodiment illustrated in FIG. 1, a conventional mixer may be included at the junction of the EGR conduit 42 and the intake conduit 22 for mixing of the exhaust gas flowing through the EGR conduit 42 and the fresh air supplied by the compressor 18.

In the illustrated embodiment, a conventional EGR cooler 44 is disposed in-line with the EGR conduit 42 and is configured to cool exhaust gas flowing through the cooler 44. The cooler 44 is configured in a conventional manner to define a coolant fluid path therethrough, and in the illustrated embodiment engine coolant is supplied by the engine 12 to a coolant inlet of the cooler 44 via a fluid conduit 46, and engine coolant circulating through the cooler 44 is returned to the engine 12 via a fluid conduit 48 that is fluidly coupled to a coolant outlet of the cooler 44. The EGR cooler 44 defines an exhaust gas inlet at one end and an exhaust gas outlet at an opposite end thereof. In the illustrated embodiment, the exhaust gas inlet is fluidly coupled directly to the exhaust manifold 34 with no flow restrictions positioned therebetween in the exhaust conduit 36 or the EGR conduit 42. Accordingly, the exhaust gas pressure in the exhaust manifold 34 will be understood to be the same as that at the exhaust gas inlet of the EGR cooler 44. Illustratively, the EGR cooler 44 is positioned sufficiently close in proximity to the exhaust manifold 34 such that no significant temperature drop occurs in the exhaust gas exiting the exhaust manifold and that entering the EGR cooler 44. Accordingly, the temperature of the exhaust gas exiting the exhaust manifold 34 will be understood to be the same as the temperature of the exhaust gas entering the EGR cooler 44.

The system 10 further includes a conventional EGR valve 50 disposed in-line with the EGR conduit 42 between the exhaust gas outlet of the EGR cooler 44 and the junction of the EGR conduit 42 and the intake conduit 22. Although not shown in FIG. 1, the system 10 may in some embodiments include a conventional EGR valve position sensor configured to produce a signal corresponding to a position of the EGR valve 50 relative to a reference position, and a conventional EGR valve actuator configured to be responsive to a control signal to control the position of the EGR valve 50 relative to the reference position.

The system 10 further includes a conventional flow restriction 52 defined by the EGR conduit 42 or a conventional flow restriction device 52 disposed in-line with the EGR conduit 42. The flow restriction 52 may be positioned between the EGR valve 50 and the intake conduit 22 in embodiments that include the EGR valve 50, as illustrated in FIG. 1, or may alternatively be positioned between the exhaust gas outlet of the EGR cooler 44 and the EGR valve 50 in embodiments that include the EGR valve 50. In either case, the flow restriction or flow restriction device 50, in the illustrated embodiment, defines a cross-sectional flow area that is less than the smallest cross-sectional flow area of the EGR valve 50 so that the flow restriction or flow restriction device 50 defines the dominant flow restriction in the EGR conduit 42. In alternate embodiments, the flow restriction or flow restriction device 50 may be omitted, and the flow restriction defined by the EGR valve 50 may define the only flow restriction in the EGR conduit 42.

The system 10 further includes a control circuit 54 that is generally operable to control and manage the overall operation of the engine 12. The control circuit 54 includes a memory unit 56 as well as a number of inputs and outputs for interfacing with various sensors and systems coupled to the engine 12. The control circuit 54 is illustratively microprocessor-based, although this disclosure contemplates other embodiments in which the control circuit 54 may alternatively be or include a general purpose or application specific control circuit capable of operation as will be described hereinafter. In any case, the control circuit 54 may be a known control unit sometimes referred to as an electronic or engine control module (ECM), electronic or engine control unit (ECU) or the like. Illustratively, the memory 56 of the control circuit 54 has stored therein one or more sets of instructions that are executable by the control circuit 54, as will be described in greater detail hereinafter, to estimate one or more engine exhaust manifold operating parameters.

The control circuit 54 includes a number of inputs for receiving signals from various sensors or sensing systems associated with system 10. The control circuit 54 is generally operable in a conventional manner to sample the signals produced by the various sensors and/or sensing systems and to process the sampled signals to determine the associated operating conditions. For example, the system 10 includes a temperature sensor 64 that is disposed in fluid communication with the coolant circulating through the engine 12, and that is electrically connected to an engine coolant temperature input, ECT, of the control circuit 54 via a signal path 66. The temperature sensor 64 may be conventional, and is operable to produce a temperature signal on the signal path 66 that is indicative of the engine coolant temperature, i.e., the operating temperature of the engine 12, which is also the temperature of the coolant supplied by the engine 12 to the coolant inlet of the EGR cooler 44 via the fluid conduit 46.

The system 10 further includes a pressure sensor 68 that is disposed in fluid communication with the intake conduit 14 and that is electrically connected to an intake manifold pressure input, IMP, of the control circuit 54 via a signal path 70. The pressure sensor 58 may be conventional, and is operable to produce a pressure signal on the signal path 70 that is indicative of the pressure within the intake manifold 14, e.g., the pressure of the charge entering the intake manifold 14 where the term "charge" is defined as the combination of fresh air supplied by the compressor 18 and recirculated exhaust gas supplied by the EGR conduit 42.

The system 10 further includes a temperature sensor 72 that is disposed in fluid communication with the EGR conduit 42 adjacent to the exhaust gas outlet of the EGR cooler 44, and that is electrically connected to a cooler outlet temperature input, COT, of the control circuit 54 via a signal path 74. The temperature sensor 72 may be conventional, and is operable to produce a temperature signal on the signal path 74 that is indicative of the temperature of the exhaust gas exiting the EGR cooler 44.

The system 10 further includes a pressure sensor 76 that is disposed in fluid communication with the EGR conduit 42 adjacent to the exhaust gas outlet of the EGR cooler 44, and that is electrically connected to a cooler outlet pressure input, COP, of the control circuit 54 via a signal path 78. The pressure sensor 76 may be conventional, and is operable to produce a pressure signal on the signal path 78 that is indicative of the pressure of the exhaust gas exiting the EGR cooler 44.

The system 10 further includes a differential pressure ($\Delta P$) sensor 80 having one fluid input that is illustratively disposed in fluid communication with the EGR conduit 42 adjacent to the exhaust gas outlet of the flow restriction or flow restriction device 52, e.g., via a conduit 82, and another fluid input that is illustratively disposed in fluid communication with the EGR conduit 42 adjacent to the exhaust gas inlet of the flow restriction or flow restriction device 52, e.g., via a conduit 84. The $\Delta P$ sensor 80 is electrically connected to a differential pressure input, $\Delta P$, of the control circuit 54 via a signal path 86. In the illustrated embodiment, the differential pressure sensor 86 may be conventional, and is operable to produce a pressure signal on the signal path 86 that is indicative of the pressure differential across the flow restriction or flow restriction device 50. In other embodiments, e.g., embodiments that do not include the flow restriction or flow restriction device 50, the $\Delta P$ sensor 80 may be alternatively positioned across the EGR valve 50 such that the pressure signal produced by the sensor 80 is indicative of the pressure differential across the EGR valve 50.

In some embodiments, the system 10 may further include, as illustrated by dashed-line representation in FIG. 1, a flow sensor 88 that is disposed in fluid communication with the EGR conduit 42, e.g., adjacent to the exhaust gas outlet of the EGR cooler 44 or other suitable location along the EGR conduit 42, and that is electrically connected to an EGR flow rate input, EGRFR, of the control circuit 54 via a signal path 90. In embodiments that include the flow sensor 88, the sensor 88 may be conventional, e.g., provided in the form of a mass flow rate sensor, and is operable to produce a flow signal on the signal path 90 that is indicative of the flow rate of exhaust gas flowing through the EGR conduit 52.

The system 10 is illustrated in FIG. 1 and described as including physical sensors producing electrical signals that are indicative of intake manifold temperature and pressure, engine coolant temperature, EGR cooler outlet temperature and pressure, EGR flow restriction pressure differential and, in some embodiments, EGR flow rate. It will be understood, however, that one or more of these parameters may be alternatively or additionally estimated by the control circuit 54 as a function of electrical signals produced by one or more other physical sensors, i.e., sensors other than those positioned and configured to produce signals that correspond to a direct measure of the subject parameter(s).

Figure 2:
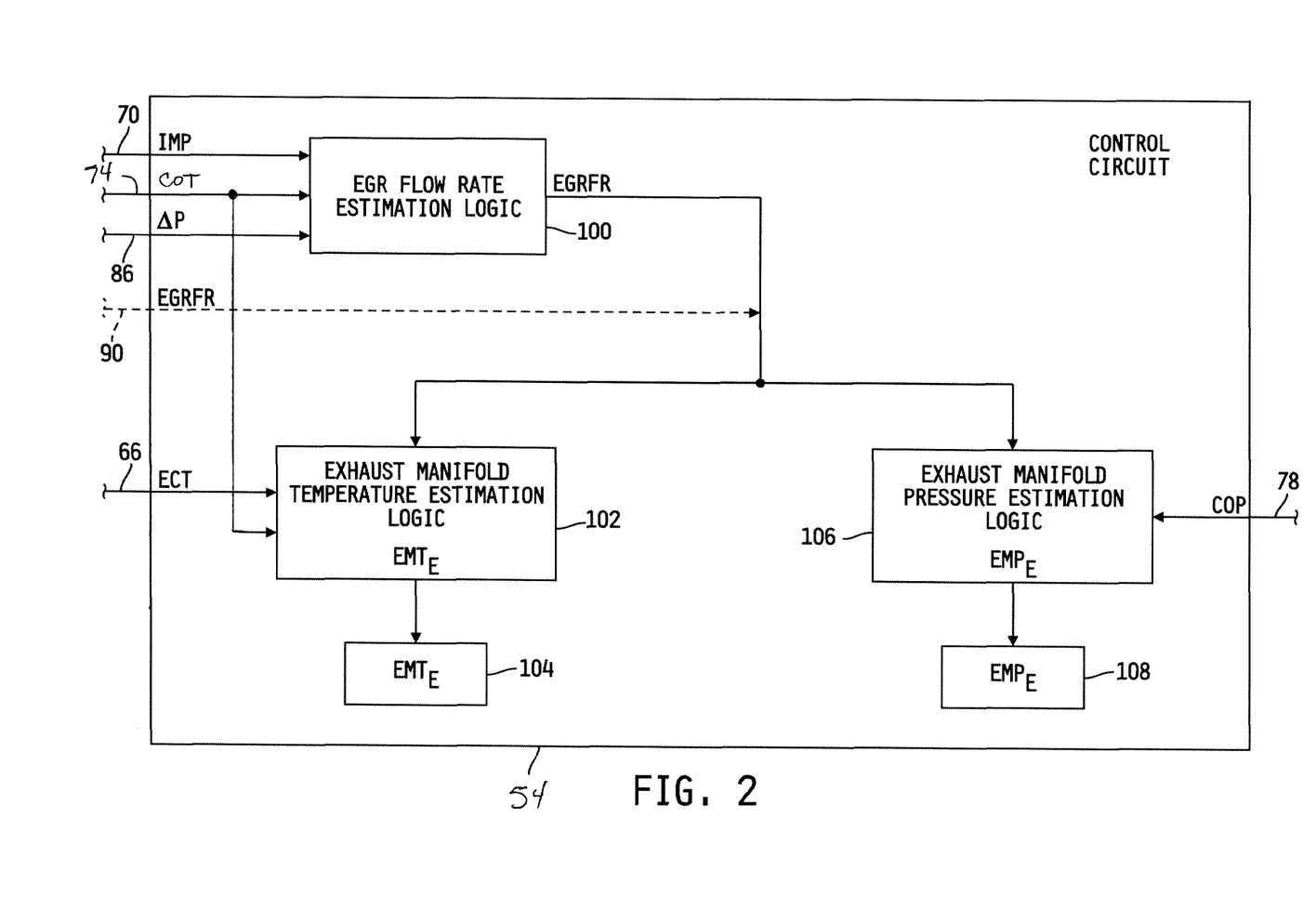
FIG. 2 is a block diagram of one illustrative embodiment of the control circuit of FIG. 1 configured to estimate exhaust manifold temperature and exhaust manifold pressure.

Referring now to FIG. 2, a block diagram is shown of one illustrative embodiment of the control circuit 54 of FIG. 1 configured to estimate two specific operating parameters of the exhaust manifold 34; namely exhaust manifold temperature and exhaust manifold pressure. However, this disclosure contemplates other embodiments in which the control circuit 54 is configured to estimate only one of the two exhaust manifold operating parameters, e.g., either exhaust manifold temperature or exhaust manifold pressure, and other embodiments in which the control circuit 54 is configured to estimate one or more other exhaust manifold operating parameters in addition to exhaust manifold temperature and/or pressure. In any case, it will be understood that the various functional blocks illustrated in FIG. 2 represent individual instructions or instruction sets stored in the memory 56 and executable by the control circuit 54 to carry out the corresponding functions as will be described in greater detail hereinafter. Together, the functional blocks illustrated in FIG. 2 represent one illustrative embodiment of instructions that are stored in the memory unit 56 and executable by the control circuit 54 to estimate one or more exhaust manifold operating parameters.

In the illustrated embodiment, the control circuit 54 includes an EGR flow rate estimation logic block 100 that receives as inputs the intake manifold pressure signal, IMP, on the signal path 70, the EGR cooler outlet temperature signal, COT, on the signal path 74 and the pressure differential signal, $\Delta P$, on the signal path 86. The EGR flow rate estimation logic block 100 processes IMP, COT and $\Delta P$ using an EGR flow rate estimation model stored in the memory 56 to produce an estimated instantaneous EGR flow rate value, EGRFR. In one illustrative embodiment, the EGR flow rate model is given by the equation $EGRFR = [C_D * A_T * (IMP - \Delta P)/\sqrt{R*COT}] * [\Delta P^{1/\gamma}] * \sqrt{[2*\gamma/(\gamma-1)]*[1-\Delta P]^{(\gamma-1)}}$,
where $C_D$ is the discharge coefficient and is a stored constant, e.g., 0.67, $A_T$ is the cross-sectional flow area of the flow restriction or flow restriction device 50 and is a stored constant based on the physical dimensions of the flow restriction or flow restriction device 50 and $\gamma$ is the ratio of specific heat capacity at constant pressure to specific heat capacity at constant volume for the cylinder charge and is a stored constant, e.g., 1.35. It will be understood, however, that this disclosure contemplates other embodiments in which the EGR flow rate estimation model includes more, fewer and/or different input parameters. Alternatively, in systems that include the flow rate sensor 88, the control circuit may be configured to process the flow signal produced by the flow rate sensor 88 in a conventional manner to determine a corresponding EGR flow rate value, and to use the EGR flow rate value determined from the flow signal in place of, or in addition to, the estimated EGR flow rate value produced by the EGR flow rate estimation logic block 100 as indicated by dashed-line representation in FIG. 2. In embodiments in which the EGR flow rate value determined from the flow signal is used in place of the estimated EGR flow rate value produced by the EGR flow rate estimation logic block 100, the EGR flow rate estimation logic block 100 may be omitted. In any case, the EGR flow rate value, EGRFR, is illustratively provided as inputs to an exhaust manifold temperature estimation logic block 102 and to an exhaust manifold pressure estimation logic block 106.

In the illustrated embodiment, the exhaust manifold temperature estimation logic block 102 also receives as inputs the engine coolant temperature signal, ECT, produced by the temperature sensor 64 on the signal path 66 and the cooler outlet temperature signal, COT, produced by the temperature sensor 72 on the signal path 74. The exhaust manifold temperature estimation logic block 102 processes EGRFR, ECT and COT using an exhaust manifold temperature estimation model stored in the memory 56 to produce an estimated exhaust manifold temperature value, $EMT_E$. The estimated exhaust manifold temperature value, $EMT_E$, is illustratively stored in a memory location 104, e.g., a buffer designed to hold one or more $EMT_T$ values, and is also illustratively made available to one or more other algorithms that are executable by the control circuit 54.

In the illustrated embodiment, the exhaust manifold pressure estimation logic block 106 receives as an input, in addition to the EGR flow rate value, EGRFR, the cooler outlet pressure signal, COP, produced by the pressure sensor 76 on the signal path 78. The exhaust manifold pressure estimation logic block 106 processes EGRFR and COP using an exhaust manifold pressure estimation model stored in the memory 56 to produce an estimated exhaust manifold pressure value, $EMP_E$. The estimated exhaust manifold pressure value, $EMP_E$, is illustratively stored in a memory location 108, e.g., a buffer designed to hold one or more $EMP_T$ values, and is also illustratively made available to one or more other algorithms that are executable by the control circuit 54.

Figure 3:
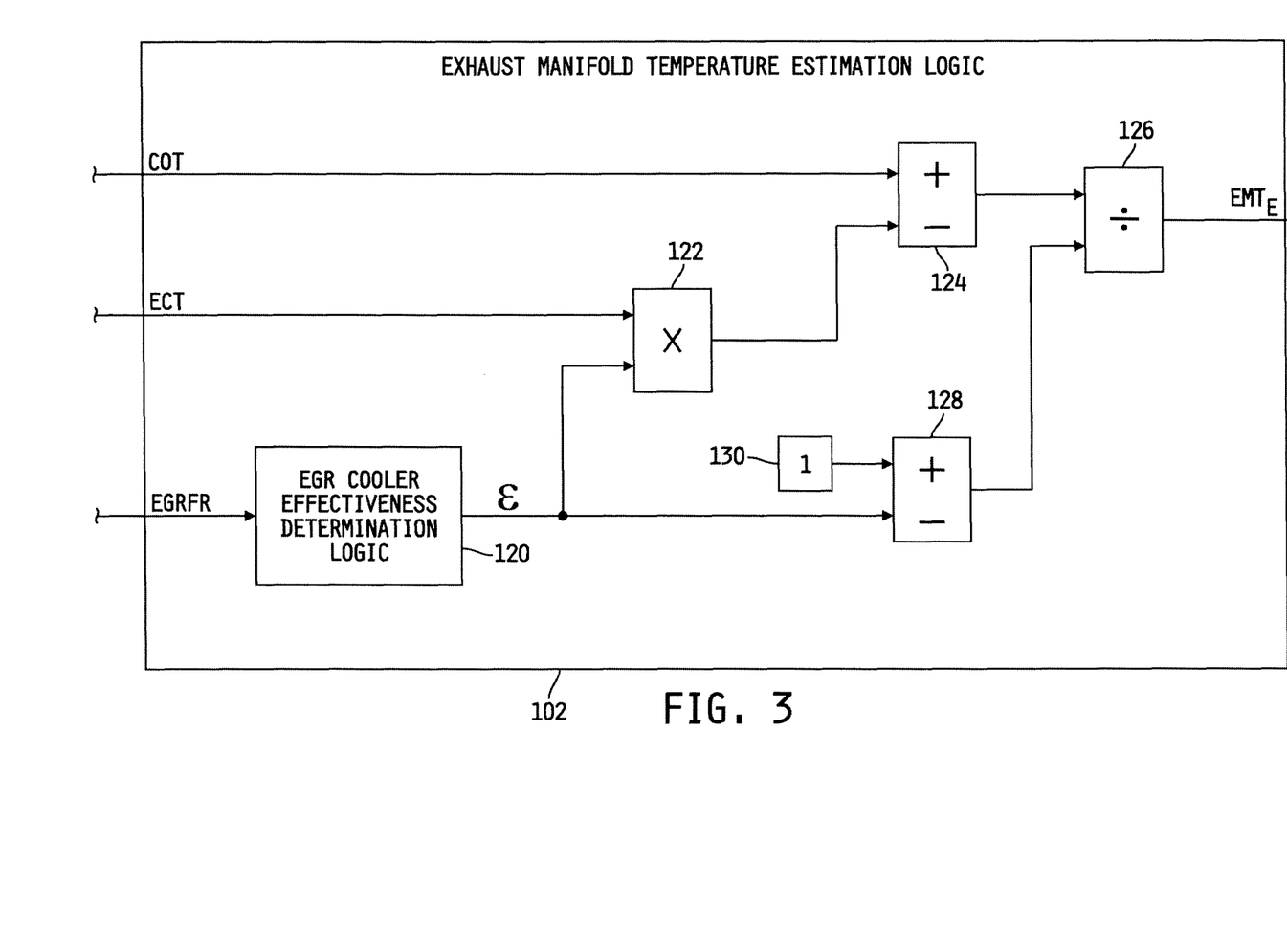
FIG. 3 is a block diagram of one illustrative embodiment of the exhaust manifold temperature estimation logic illustrated in FIG. 2.

Referring now to FIG. 3, a block diagram is shown of one illustrative embodiment of the exhaust manifold temperature estimation logic block 102 of FIG. 2. In the illustrate embodiment, the logic block 102 includes an EGR cooler effectiveness determination logic block 120 that receives as an input the EGR flow rate value, EGRFR, as described hereinabove with respect to FIG. 2. The EGR cooler effectiveness determination logic block 120 processes EGRFR to produce an EGR cooler effectiveness value, $\epsilon$, where $\epsilon$ represents an instantaneous measure of the ability of the EGR cooler 44 to cool exhaust gas flowing therethrough primarily as a function of the flow rate, EGRFR, of exhaust gas through the cooler 44. In one illustrative embodiment, the EGR cooler effectiveness determination logic block 120 is configured to compute $\epsilon$ from an empirical correlation of the form $\epsilon = c_o + c_1 * EGRFR + c_2 * EGRFR^2$, where $c_o$, $c_1$ and $c_2$ represent correlation constants. Alternatively, the EGR cooler effectiveness determination logic block 120 may be configured to include additional system operating parameters in the empirical correlation, or may alternatively still be provided in the form of one or more other models designed to determine an EGR cooler effectiveness value, $\epsilon$, as a function of one or more system operating parameters.

In any case, the EGR cooler effectiveness value, $\epsilon$, is provided as one input to a multiplication block 122 having another input receiving the engine coolant temperature value, ECT. The product of $\epsilon$ and ECT is provided as a subtractive input to a summation block 124 having an additive input receiving the cooler outlet temperature value, COT. The difference $(COT - \epsilon*ECT)$ is provided as a numerator input to a division block 126. The EGR cooler effectiveness value, $\epsilon$, is also provided to a subtractive input of another summation block 128 having an additive input receiving the value 1 stored in a memory block 130. The output of the summation block 128 is thus represented by the quantity $(1-\epsilon)$, and is provided as a denominator input to the division block 126. The output of the division block 126 defines the estimated exhaust manifold temperature value, $EMT_E$, and in the embodiment illustrated in FIG. 3 the estimated exhaust manifold temperature value, $EMT_E$, is defined by the equation $EMT_E=(COT-\epsilon*ECT)/(1-\epsilon)$. It will be understood that the $EMT_E$ equation may alternatively be provided in the form of one or more plots, graphs or tables stored in the memory 56 of the control circuit 54. In any such embodiment, the exhaust manifold temperature estimation block 102 may alternatively still define $EMT_E$ as a function of more, fewer and/or different system operating parameters.

Figure 4:
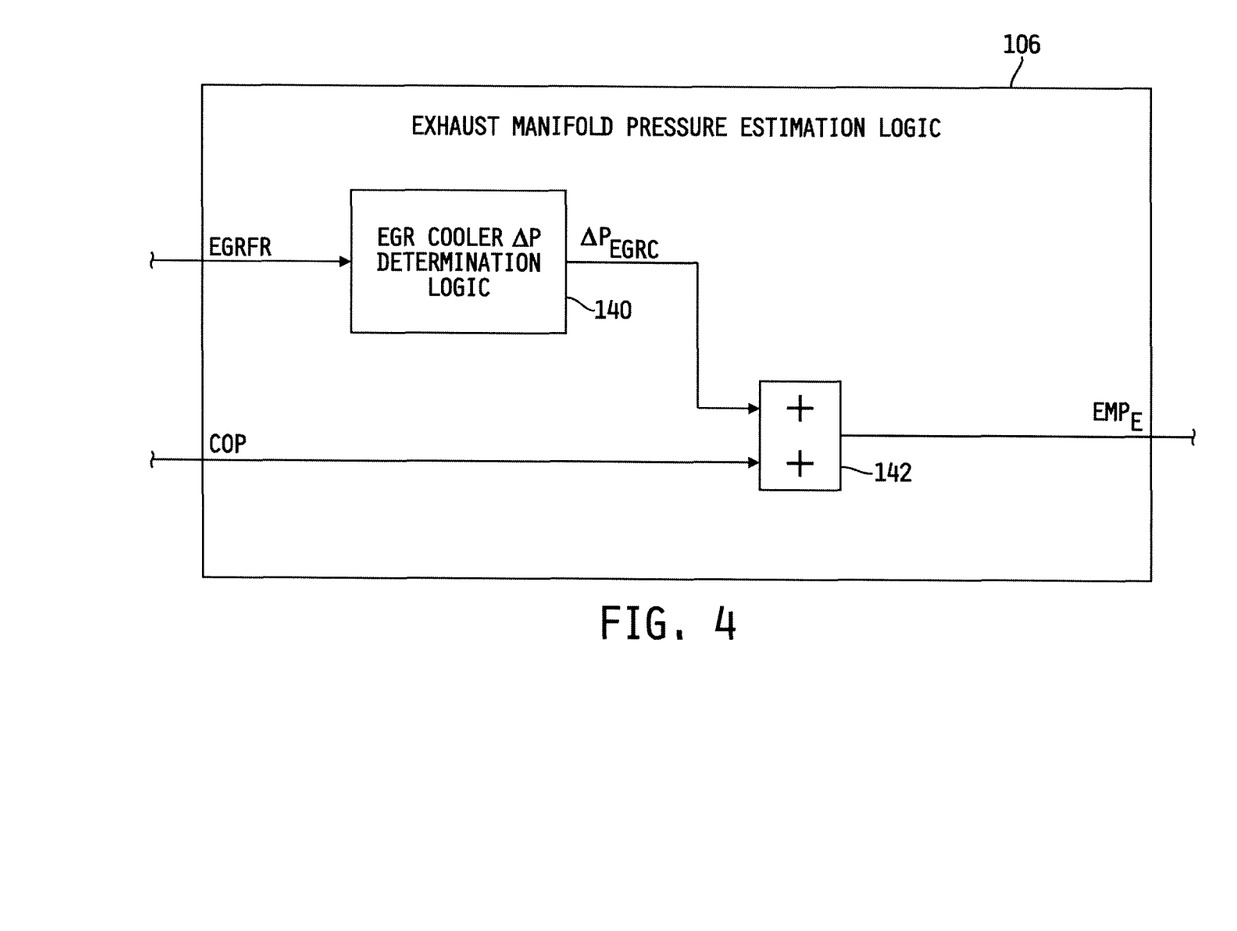
FIG. 4 is a block diagram of one illustrative embodiment of the exhaust manifold pressure estimation logic illustrated in FIG. 2.

Referring now to FIG. 4, a block diagram is shown of one illustrative embodiment of the exhaust manifold pressure estimation logic block 106 of FIG. 2. In the illustrate embodiment, the logic block 106 includes an EGR cooler ΔP determination logic block 140 that receives as an input the EGR flow rate value, EGRFR, as described hereinabove with respect to FIG. 2. The EGR cooler ΔP determination logic block 140 processes EGRFR to produce an EGR cooler ΔP value, $\Delta P_{EGRC}$, where $\Delta P_{EGRC}$ represents the instantaneous pressure drop across the EGR cooler 44 primarily as a function of the flow rate, EGRFR, of exhaust gas through the cooler 44. In one illustrative embodiment, the EGR cooler ΔP determination logic block 140 is configured to compute $\Delta P_{EGRC}$ from an empirical correlation of the form $\Delta P_{EGRC}=a_1*EGRFR+a_2*EGRFR^2$, where $a_1$ and $a_2$ represent correlation constants. Alternatively, the EGR cooler ΔP determination logic block 140 may be configured to include additional system operating parameters in the empirical correlation, or may alternatively still be provided in the form of one or more other models designed to determine an EGR cooler ΔP value, $\Delta P_{EGRC}$, as a function of one or more system operating parameters.

In any case, the EGR cooler ΔP value, $\Delta P_{EGRC}$, is provided as one additive input to a summation block 142 having another additive input receiving the cooler outlet pressure value, COP. The output of the summation block 142 defines the estimated exhaust manifold pressure value, $EMP_E$, and in the embodiment illustrated in FIG. 4 the estimated exhaust manifold pressure value, $EMP_E$, is defined by the equation $EMP_E=COP+\Delta P_{EGRC}$. It will be understood that the $EMP_E$ equation may alternatively be provided in the form of one or more plots, graphs or tables stored in the memory 56 of the control circuit 54. In any such embodiment, the exhaust manifold pressure estimation block 102 may alternatively still define $EMP_E$ as a function of more, fewer and/or different system operating parameters.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A system for estimating pressure of an exhaust manifold operatively coupled to an internal combustion engine, the system comprising:
    an exhaust gas recirculation (EGR) conduit fluidly coupled at one end to the exhaust manifold and at an opposite end to an intake manifold operatively coupled to the engine,
    an EGR cooler disposed in-line with the EGR conduit and configured to cool exhaust gas flowing therethrough,
    means for determining a flow value corresponding to a flow rate of exhaust gas through the EGR conduit,
    a pressure sensor in fluid communication with the EGR conduit adjacent an exhaust gas outlet of the EGR cooler and configured to produce a signal indicative of pressure of the exhaust gas in the EGR conduit adjacent to the exhaust gas outlet of the EGR cooler, and
    a control circuit including a memory having instructions stored therein that are executable by the control circuit to:
        estimate the pressure of the exhaust manifold as a function of at least the flow value and the signal indicative of the pressure of the exhaust gas in the EGR conduit,
        determine a pressure drop across the EGR cooler as a function of the flow value, and
        estimate the exhaust manifold pressure as a function of the signal indicative of the pressure of the exhaust gas in the EGR conduit and the pressure drop across the EGR cooler.

2. The system of claim 1 wherein the instructions stored in the memory further include instructions that are executable by the control circuit to process the signal indicative of the pressure of the exhaust gas in the EGR conduit to determine the exhaust gas pressure in the EGR conduit adjacent to the exhaust gas outlet of the EGR cooler, and to estimate the exhaust manifold pressure as a sum of the exhaust gas pressure in the EGR conduit adjacent to the exhaust gas outlet of the EGR cooler and the pressure drop across the EGR cooler.

3. The system of claim 2 further comprising a turbocharger having a turbine defining an exhaust gas inlet fluidly coupled to the exhaust manifold via an exhaust gas conduit, wherein the one end of the EGR conduit is fluidly coupled to the exhaust gas conduit between the exhaust manifold and the exhaust gas inlet of the turbine such that the estimated exhaust manifold pressure represents a back pressure between the exhaust manifold and the turbine.

4. The system of claim 1 wherein the cooler defines an exhaust gas inlet positioned in direct fluid communication with the exhaust manifold with no exhaust gas flow restrictions positioned between the exhaust gas inlet of the cooler and the exhaust manifold.

5. A system for estimating temperature of an exhaust manifold operatively coupled to an internal combustion engine, the system comprising:
    an exhaust gas recirculation (EGR) conduit fluidly coupled at one end to the exhaust manifold and at an opposite end to an intake manifold operatively coupled to the engine,
    a cooler disposed in-line with the EGR conduit and configured to cool exhaust gas flowing therethrough,
    means for determining a flow value corresponding to a flow rate of exhaust gas through the EGR conduit,
    a first temperature sensor in fluid communication with the EGR conduit adjacent an exhaust gas outlet of the cooler and configured to produce a first signal, the first signal is indicative of exhaust gas temperature in the EGR conduit adjacent to the exhaust gas outlet of the cooler, and
    a second temperature sensor configured to produce a second signal that is indicative of an operating temperature of engine coolant entering the cooler, and
    a control circuit including a memory having instructions stored therein that are executable by the control circuit to estimate the exhaust manifold temperature as a function of the flow value, the first signal and the second signal.

6. The system of claim 5 wherein the instructions stored in the memory further include instructions that are executable by the control circuit to determine a cooler effectiveness value as a function of the flow value, and to estimate the exhaust manifold temperature as a function of the first signal, the second signal and the cooler effectiveness value.

7. The system of claim 6 wherein the instructions stored in the memory further include instructions that are executable by the control circuit to process the first signal to determine the exhaust gas temperature adjacent to the exhaust gas outlet of the cooler, to process the second signal to determine the temperature of the engine coolant entering the cooler, and to estimate the exhaust manifold temperature as a ratio of the exhaust gas temperature adjacent to the exhaust gas outlet of the cooler less a product of the cooler effectiveness value and the temperature of the engine coolant exiting the cooler and a difference of one less the cooler effectiveness value.

8. The system of claim 7 further comprising a turbocharger having a turbine defining an exhaust gas inlet fluidly coupled to the exhaust manifold via an exhaust gas conduit, wherein the one end of the EGR conduit is fluidly coupled to the exhaust gas conduit between the exhaust manifold and the exhaust gas inlet of the turbine such that the estimated exhaust manifold temperature represents a temperature of exhaust gas existing the exhaust manifold and entering the exhaust gas inlet of the turbine.

9. The system of claim 5, wherein the cooler defines an exhaust gas inlet positioned in direct fluid communication with the exhaust manifold with no exhaust gas flow restrictions positioned between the exhaust gas inlet of the cooler and the exhaust manifold.

10. A method for estimating pressure of an exhaust manifold operatively coupled to an internal combustion engine having an exhaust gas recirculation (EGR) conduit fluidly coupled at one end to the exhaust manifold and at an opposite end to an intake manifold operatively coupled to the engine, and an EGR cooler disposed in-line with the EGR conduit and configured to cool exhaust gas flowing therethrough, the method comprising:
  determining, by an engine operation control circuit, a flow value corresponding to a flow rate of exhaust gas through the EGR conduit,
  measuring exhaust gas pressure in the EGR conduit adjacent to the exhaust gas outlet of the EGR cooler,
  determining, by the engine operation control circuit, a pressure drop across the EGR cooler as a function of the flow value, and
  estimating, by the engine operation control circuit, the pressure of the exhaust manifold as a function of the exhaust gas pressure in the EGR conduit adjacent to the exhaust gas outlet of the EGR cooler and the pressure drop across the EGR cooler.

11. The method of claim 10 wherein estimating the exhaust manifold pressure comprises estimating the exhaust manifold pressure as a sum of the exhaust gas pressure in the EGR conduit adjacent to the exhaust gas outlet of the cooler and the pressure drop across the cooler.

12. The method of claim 10 wherein determining a flow value corresponding to a flow rate of exhaust gas through the EGR conduit comprises measuring the flow rate of exhaust gas through the EGR conduit.

13. The method of claim 10 wherein determining a flow value corresponding to a flow rate of exhaust gas through the EGR conduit comprises:
  measuring an intake manifold pressure corresponding to pressure within the intake manifold,
  measuring an EGR cooler outlet temperature corresponding to temperature at an exhaust gas outlet of the cooler,
  measuring a pressure drop across a flow restriction disposed in-line with the EGR conduit and positioned between the exhaust gas outlet of the cooler and the opposite end of the EGR conduit, and
  estimating the flow value as a function of the measured intake manifold pressure, the measured EGR cooler outlet temperature and the measured pressure drop across the flow restriction.

14. The method of claim 10 further comprising:
  measuring exhaust gas temperature in the EGR conduit adjacent to the exhaust gas outlet of the cooler,
  measuring an operating temperature of engine coolant entering the cooler,
  determining a cooler effectiveness value as a function of the flow value, and
  estimating exhaust manifold temperature as a function of the exhaust gas temperature in the EGR conduit adjacent to the exhaust gas outlet of the cooler, the operating temperature of engine coolant entering the cooler and the cooler effectiveness value.

15. The method of claim 10, wherein determining a flow value corresponding to a flow rate of exhaust gas through the EGR conduit is performed via a flow sensor.

16. The method of claim 10, wherein measuring exhaust gas pressure in the EGR conduit adjacent to the exhaust gas outlet of the cooler is performed via a pressure sensor.

17. A method for estimating a temperature of an exhaust manifold operatively coupled to an internal combustion engine having an exhaust gas recirculation (EGR) conduit fluidly coupled at one end to the exhaust manifold and at an opposite end to an intake manifold operatively coupled to the engine, and an EGR cooler disposed in-line with the EGR conduit and configured to cool exhaust gas flowing therethrough, the method comprising of:
  determining, via an engine control circuit, a flow value corresponding to a flow rate of exhaust gas through the EGR conduit,
  measuring exhaust gas temperature in the EGR conduit adjacent to the exhaust gas outlet of the EGR cooler,
  measuring an operating temperature of engine coolant entering the EGR cooler, and
  estimating, via an engine control circuit, an exhaust manifold temperature as a function of at least the flow value and the exhaust gas temperature in the EGR conduit adjacent to the exhaust gas outlet of the EGR cooler and the operating temperature of engine coolant entering the EGR cooler.

18. The method of claim 17 further comprising determining a cooler effectiveness value as a function of the flow value, and wherein estimating the exhaust manifold temperature comprises estimating the exhaust manifold temperature as a function of the exhaust gas temperature in the EGR conduit adjacent to the exhaust gas outlet of the cooler, the operating temperature of engine coolant entering the cooler and the cooler effectiveness value.

19. The method of claim 18 wherein estimating the exhaust manifold temperature comprises estimating the exhaust manifold temperature as a ratio of the exhaust gas temperature in the EGR conduit adjacent to the exhaust gas outlet of the cooler less a product of the cooler effectiveness value and the operating temperature of the engine coolant entering the cooler and a difference of one less the cooler effectiveness value.

20. The method of claim 17 wherein determining a flow value corresponding to a flow rate of exhaust gas through the EGR conduit comprises measuring the flow rate of exhaust gas through the EGR conduit.

21. The method of claim 17 wherein determining a flow value corresponding to a flow rate of exhaust gas through the EGR conduit comprises:
- measuring an intake manifold pressure corresponding to pressure within the intake manifold,
- measuring an EGR cooler outlet temperature corresponding to temperature at an exhaust gas outlet of the cooler,
- measuring a pressure drop across a flow restriction disposed in-line with the EGR conduit and positioned between the exhaust gas outlet of the cooler and the opposite end of the EGR conduit, and
- estimating the flow value as a function of the measured intake manifold pressure, the measured EGR cooler outlet temperature and the measured pressure drop across the flow restriction.

22. The method of claim 17, wherein determining a flow value corresponding to a flow rate of exhaust gas through the EGR conduit is performed via a flow sensor.

* * * * *